(12) United States Patent
Lüthje et al.

(10) Patent No.: US 7,350,419 B2
(45) Date of Patent: Apr. 1, 2008

(54) CONTROL DEVICE FOR NON-POSITIVE CONNECTIONS

(75) Inventors: Holger Lüthje, Halstenbek (DE); Saskia Biehl, Wendeburg (DE); Ralf Bandorf, Braunschweig (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 200 days.

(21) Appl. No.: 10/511,252

(22) PCT Filed: Apr. 10, 2003

(86) PCT No.: PCT/EP03/03750

§ 371 (c)(1),
(2), (4) Date: Feb. 24, 2005

(87) PCT Pub. No.: WO03/087751

PCT Pub. Date: Oct. 23, 2003

(65) Prior Publication Data

US 2006/0051180 A1    Mar. 9, 2006

(30) Foreign Application Priority Data

Apr. 12, 2002  (DE) .................... 102 17 284

(51) Int. Cl.
    *F16B 31/02* (2006.01)
(52) U.S. Cl. ........................................... 73/761
(58) Field of Classification Search ............ 73/761
    See application file for complete search history.

(56) References Cited

U.S. PATENT DOCUMENTS

| | | | |
|---|---|---|---|
| 3,358,257 A * | 12/1967 | Brewer et al. ............ 338/5 |
| 4,002,139 A * | 1/1977 | Payne ................. 116/212 |
| 4,170,163 A * | 10/1979 | Payne ................... 411/14 |
| 4,525,114 A * | 6/1985 | Hirst ..................... 411/9 |
| 5,291,789 A * | 3/1994 | Walton .................. 73/761 |
| 5,343,759 A * | 9/1994 | Hesthamar et al. ....... 73/761 |
| 5,461,923 A * | 10/1995 | Meisterling ............. 73/761 |
| 5,584,627 A * | 12/1996 | Ceney et al. ............ 411/14 |
| 5,615,575 A * | 4/1997 | Goodwin ............. 73/862.541 |
| 5,769,581 A | 6/1998 | Wallace et al. .......... 411/10 |
| 6,810,747 B2 * | 11/2004 | Engler et al. ........... 73/761 |
| 6,932,044 B1 * | 8/2005 | Fenech ............... 123/195 C |
| 7,073,390 B2 * | 7/2006 | Luthje et al. ........... 73/777 |
| 2003/0039527 A1 * | 2/2003 | Schatz ................... 411/9 |

FOREIGN PATENT DOCUMENTS

DE    198 31 372 A1    1/2000

(Continued)

OTHER PUBLICATIONS

International Search Report dated Aug. 14, 2003.

*Primary Examiner*—Edward Lefkowitz
*Assistant Examiner*—Octavia Davis
(74) *Attorney, Agent, or Firm*—Young Basile

(57) ABSTRACT

The invention relates to a control device for non-positive connections, especially screw connections. The device includes two force application elements and a measuring element arranged therebetween. The measuring element is at least partially provided with a layer having a force sensory effect. The surface of the layer is provided with elevations for receiving a force applied by the force application elements.

16 Claims, 4 Drawing Sheets

FOREIGN PATENT DOCUMENTS

| | | |
|---|---|---|
| DE | 199 54 164 A1 | 6/2001 |
| EP | 0844469 | 5/1998 |
| GB | 2310288 | 6/1997 |
| WO | WO 01/53707 | 7/2001 |
| WO | WO 01/59417 A1 | 8/2001 |

\* cited by examiner

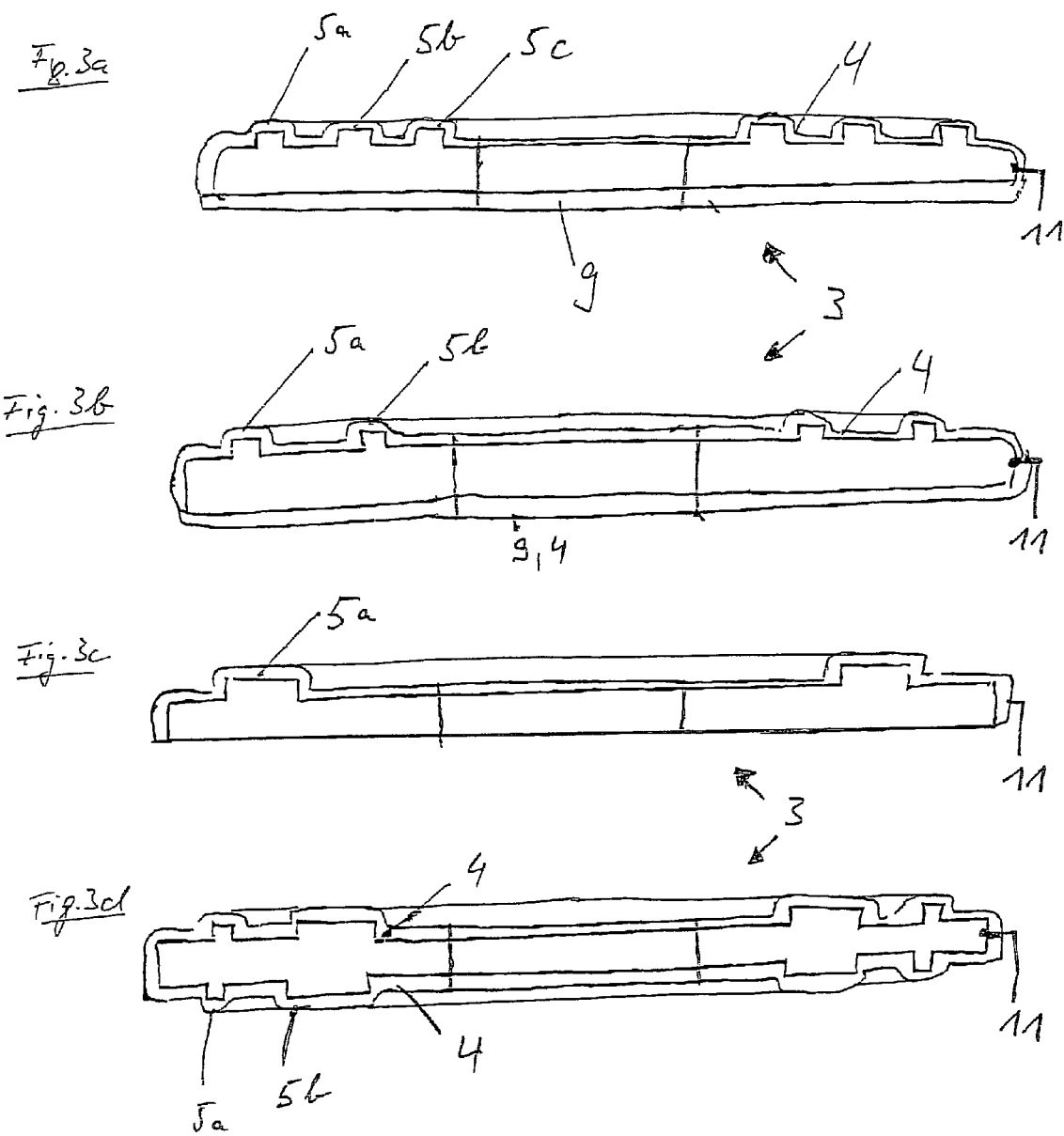

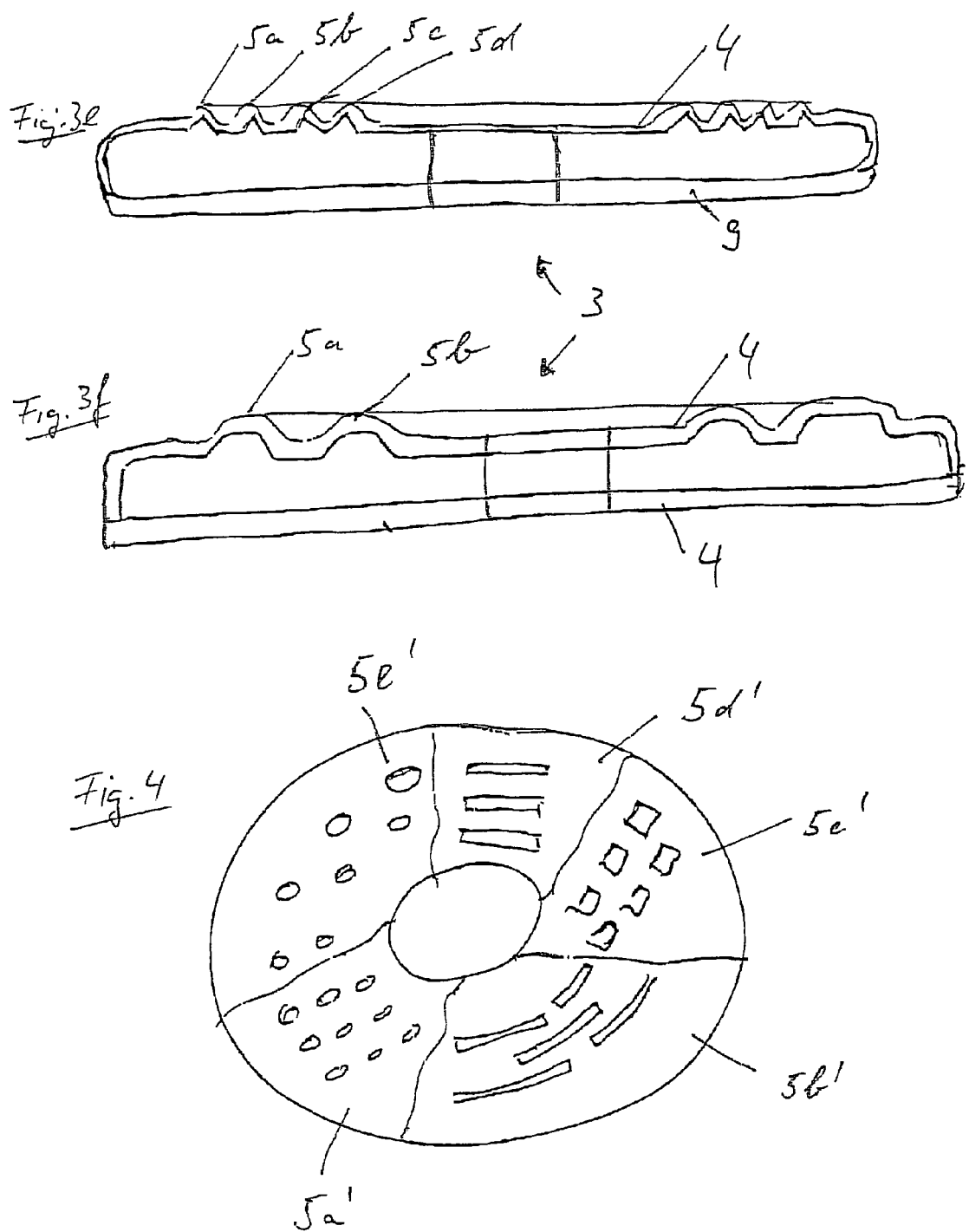

CONTROL DEVICE FOR NON-POSITIVE CONNECTIONS

This application is a 371 of PCT/EP03/03750.

BACKGROUND OF THE INVENTION

The invention relates to a control device for non-positive connections, advantageously screw connections.

Screw connections are based on the conversion of a torque into an axial force via a thread. This force results in a reversible elongation of the shaft of the screw and presses the components to be joined against one another in non-positive manner. Screw connections are numbered among the detachable connections in the construction industry, wherein their greatest danger is also found. These connections can lose their function due to vibration, settlement processes or the like.

To prevent independent detachment various methods are employed. Split pins can be fitted transversely through the screw to prevent it falling out. But then the joint has in reality already been loosened. Various types of adhesives are further used which are intended to prevent loosening due to vibration. Furthermore, elastic screws are used which maintain a certain tension and thus should prevent them vibrating loose.

All these methods, however, provide no information about the state of a screw connection and are intended to maintain a status quo which has already set in. The quality of a screw connection is determined by the axial pretensioning which in more demanding structures must be within a certain range. Thus, for constant monitoring an axial force must be continuously measured.

To measure the axial force of screw connections methods are known in which the tightening torque is converted into an axial force. These methods yield only unreliable results and are highly dependent, for example, on the coefficient of friction between the screw head and the underlying material which changes markedly with operating time.

For measuring the axial force it is, furthermore, known to apply a piezoelectric layer system on the screw head. In this way a very precise measure of the axial load in the screw connection is obtained via an ultrasonic reading device. Such a procedure, however, is associated with some disadvantages. On the one hand, it is not suitable for every shape of head and, on the other hand, a new characteristic curve must be recorded for every type of screw. Furthermore, due to the high cost of the ultrasonic read-out continuous monitoring of many screw connections is hardly economically achievable.

Known solutions have been described in DE 198 31 372 and DE 199 54 164. These solutions, however, have the disadvantage that a relatively great deformation and hence measuring distance must be used as may be seen in DE 198 31 372 with reference to FIG. 1b or 1c. A great disadvantage of the known solutions also consists in that there can be no optimized adjustment of the axial force measurement. When the piezoresistive measuring layer on a U-disk is used as presented in DE 199 54 164, the change in resistance as a function of force exhibits an exponential relationship. Consequently, with high loads the sensitivity of the measurement falls since the gradient of the curves turns out to be considerably flatter. In order nevertheless still to obtain precise results for the axial force transmitted to the screw shaft a sensitive electronic measuring system is needed or particularly costly boundary conditions have to be created so that in spite of everything a sufficiently precise and informative measurement can be carried out. This gives rise to high costs for measurements, which may still be inaccurate.

Accordingly, it is an object of the present invention to provide a device for checking non-positive connections that affords a low-cost and exact determination of the axial force introduced into the non-positive connection, in particular a screw connection.

SUMMARY OF THE INVENTION

This task is solved by means of a device for non-positive connections, in particular screw connections, wherein the device possesses force-application elements and at least one measuring element, wherein the measuring element is provided at least in some areas with a layer exhibiting a force sensory effect, characterized in that the force sensory layer changes its electrical resistance due to changes of an applied force and the surface of the layer has as support profiles flat prominences constructed for recording force for recording a force applied by the force application elements.

By virtue of a measuring element acted upon by force-application elements being provided with a layer having a force sensory effect and the surface of the force sensory layer having bumps in the layer in the form of flat prominences for absorbing a force applied by the force-application elements it is possible to set the shape of the curve (change in resistance versus the force applied) by providing certain support profiles. Thus, it is possible to vary certain bump profiles (eg in their surface area or shape) in such a way that the measurement can always be made in an optimum region of the curve in which a favourable gradient of the curve can be used for evaluation without the need for costly evaluation methods. Thus, it is possible in this way for the core of the measuring element and/or an intermediate layer and/or the force sensory layer to have flat bumps which are constructed as support profiles. By this means there is selective adaptation by specifying the desired absorbing surface area for the force to be applied. In terms of the present invention, by "force-application elements" is meant all elements (regardless of their shape and number) which can apply a force to the measuring element according to the invention.

This teaching according to the invention is possible in principle for all layers exhibiting a force sensory effect. In the present application a "force sensory effect" can be taken to mean any material whose electrical resistance changes under the influence of mechanical loading. A known subgroup of this type is provided by way of example by piezoresistive materials.

Advantageous refinements of the present invention are specified in the dependent claims.

A very advantageous refinement provides that the force-application elements are parts of a screw connection. In doing so the first force-application element can be the head of a set screw and the second force-application element complementary thereto a nut on the set screw. Alternatively, it is also possible to provide a screw bolt, wherein the force-application elements take the form of two nuts which enclose the measuring element (together with the structural element to be joined). In principle, however, the invention is usable for all non-positive connections, eg also for any stays, brackets and mounts. In principle the connection can also be used for strength control of rivet connections etc.

Another refinement provides that the measuring element has upper and lower sides located opposite one another, wherein the upper and/or lower side are each provided with a layer exhibiting a force sensory effect. This means that in the measuring element, which preferably has a flat cross-section (eg is provided with a round or square shape or with an additional twisting safeguard), the prominences which as it were represent the "force sensor" can be optionally arranged on the upper or lower side of the measuring element. Of course it is also possible for the latter to be provided on both sides of the measuring element and signal processing can then be evaluated in a common or a separate circuit for the upper and lower side.

Depending on the material of the core of the measuring element on which the force sensory layer is applied (that is primarily dependent on whether this core is electrically conducting or not) the measuring element can be provided in those areas not covered by a force sensory layer either with an electrically insulating layer (ie, for example, more than $10^{15}$ ohm cm) or be uncovered in these residual areas (in the case of an electric insulator).

Different designs are possible for the shape of the measuring element but a hollow cylindrical shape is particularly advantageous. In this case the measuring element has the form of a disk having a central hole allowing passage of a bolt or screw.

In relation to this in particular a refinement provides that the bumps are arranged in the form of rings on the upper or lower side of the measuring element, that is, for example, concentrically relative to the hole for passing the screw through. With regard to this it is also possible that a plurality of annular prominences are provided which again are arranged concentrically relative to one another.

Depending on the desired contact surface or force-deformation relationship these annular prominences can possess a rectangular, triangular or rounded cross-section perpendicular to the circumferential direction.

Independently of this a plurality of elevated areas possessing completely different geometries may also be provided. Thus, for example, individual areas may have collections of cylindrical elements located beside one another on the surface of the measuring element, rectangular elements, etc. In principle the support profile of these prominences is arbitrarily variable with regard to type and/or number. With the aid of methods known from texturing technology pretty well any shapes are producible. Known methods include, for example, embossing, forming and pressing methods, methods from grinding and machining technology and etching methods, laser texturing and spark erosion. The different elevated areas (regardless of whether they are accommodated on a common side of the measuring element or not) are, if required, electrically addressable independently of one another.

This can be useful for thermal compensation or for obtaining an average value (compensation, for example, of geometric tolerances in a screw or in a structural part to be joined). In principle the regions located on the upper and lower side can each separately be electrically addressed and in terms of signals be processed jointly in a parallel circuit. In doing so, for selective control of the resistance the thickness of the layer on the upper or lower side can be built up differently in each case.

A particularly advantageous refinement provides that the measuring element, in the shape, for example, of a washer, is accommodated in an eyelet to prevent changes in position of the measuring element in the event of movement of the force-application elements relative to one another. By this means it is prevented that in the event, for example, of rotation of a screw head the measuring element in the form of a washer automatically turns with it. Such parallel rotation can be harmful particularly when the force sensory layer is composed of a highly wear-resistant material. At the same time fractures in the layer may occur which falsify the measured values or mechanically damage the screw connection or its adjoining parts.

A common embodiment provides that the measuring element has a core onto which the force sensory coating is applied. The core is preferably made from hardened or unhardened steel or alloyed steels or stainless steel or from ceramic materials or from glass-fibre reinforced plastics etc. To prevent brittle fractures in the coating it is, however, useful in the case of diamond-like carbon compounds in the force sensory layer not to provide core materials which are too readily deformable, eg lead. In principle the core can even be produced from materials having a low melting point since in the case of use of force-sensitive diamond-like carbon layers the layer can also be applied by cold methods (preferably below 150 degrees centigrade).

The force sensory layer can be formed from various materials. Possibilities include, for example, mechanically rigid semiconductors or known piezoresistive materials. The force sensory layer can be produced with the aid of known CVD and PVD methods and in the case of diamond-like piezoresistive layers production ensues, for example, by means of plasma CVD technology. Metal-doped, diamond-like force sensory layers can, for example, be produced by means of ARC, sputter and gas flow methods. With regard to potential layer materials we refer expressly to DE 199 54 164 A1 (also published as U.S. Pat. No. 7,073,390 B2) in which an abundance of materials is specified. To avoid repetition reference is made only to this published application the full details of which relating to the material should be incorporated in the present application. It must be emphasized that constructing the force sensory layer of amorphous carbon is particularly advantageous. For example, graphitic structures having sp2 hybridization can be provided in combination with diamond-like structures having sp3 hybridization.

The device according to the invention can additionally contain electric connections and an electric circuit for obtaining, transmitting and evaluating signals. To prevent problems due to ingress of liquid or the ability of individual elements to rotate transmission of signal values can also ensue by telemetry.

Other advantageous refinements of the present invention are hereinafter.

BRIEF DESCRIPTION OF THE DRAWINGS

The invention will now be explained with reference to a number of figures.

FIGS. 3a to 3f show other embodiments of a measuring element according to the invention; and FIG. 4 shows different prominence regions in plan view of another embodiment of a measuring element according to the invention.

DETAILED DESCRIPTION OF THE PREFERRED EMBODIMENT

Figure 1:
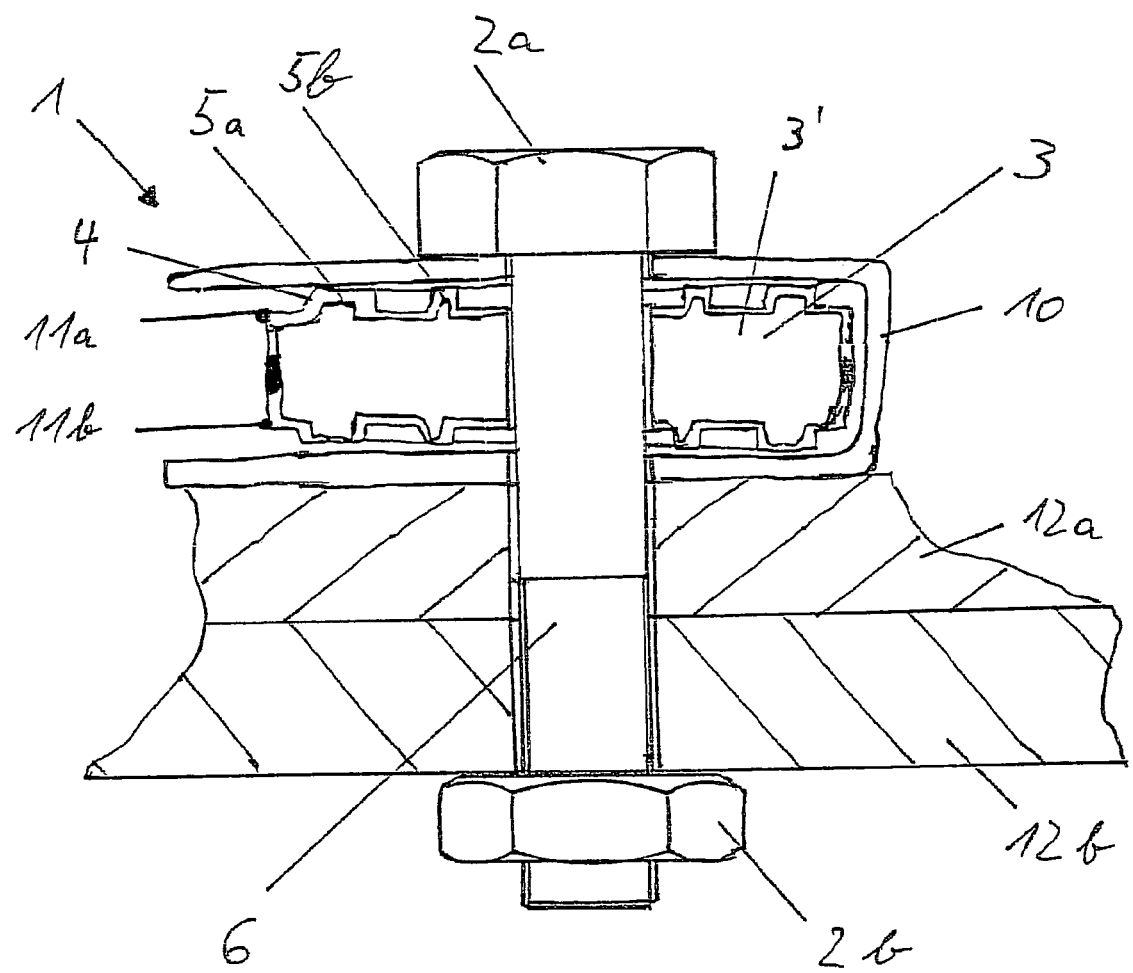
FIG. 1 shows a device according to the invention for checking non-positive connections in the installed state.

FIG. 1 shows a device 1 for checking non-positive connections. A screw connection is shown. A screw shaft 6 has a screw head 2a rigidly connected thereto at its upper end and a nut 2b screwed on by means of a thread at its lower end. The screw head 2a and nut 2b are two force-application elements as defined by the invention.

Fitted between these force-application elements are two structural elements 12a and 12b to be joined in non-positive manner which have corresponding openings for the screw shaft 6 to pass through. Provided on the upper structural element 12a is a measuring element 3 according to the invention inside a sleeve 10. The measuring element 3 is covered substantially over its entire surface by a layer 4. Fitted on the upper and on the lower side of the measuring element 3 are concentric annular prominences 5a (outside) and 5b (inside) which are concentric with a central bore for the screw shaft to pass through. The prominences project from the upper and lower side of the measuring element 3 and are connected to the insides of the sleeve 10, ie only the prominences are connected to the upper or lower inside wall of the sleeve and thus only these are subjected to compressive force when the distance between the two force-application elements is shortened.

For detecting the level of a compressive force on the measuring element 3 the layer 4 exhibits a force sensory effect as set out in the definition given above. In this case the layer 4 is formed from an amorphous carbon such as may be found in DE 199 54 164 A1 for example. In principle, however, all materials exhibiting a change in electrical resistance under mechanical load are conceivable for this application.

An essential feature of the present invention is that due to the construction of the support profiles on the measuring element 3, ie the force-absorbing elevations (eg 5a and 5b) the area over which the compressive force of the force-application elements is distributed can be varied within practically any limits. As already stated above this is useful in order to obtain a favourable range for evaluating the relationship between applied force and change in electrical resistance.

In a preferred version electrical contact takes place via the core of the measuring element 3 and the second contact via the grounding of the device. However, other measurement-based evaluations are also possible.

The measurement-based evaluation ensues through electrical contacts 11a and 11b. In this case the electrical contacts 11a and 11b are initially insulated from one another. They are each connected to the force sensory layers of the upper and lower sides which are electrically insulated from one another. In principle the layers on the upper side and on the lower side form mutually independent measuring sensors of the measuring element 3 which are each connected to another pole which is not illustrated (earth pole; for this purpose customary electrically conducting materials have to be chosen for the adjoining components). To improve signal quality the signals from the force sensory layers on the upper or lower side can be recorded in a common parallel circuit and evaluated later.

Of course the measuring element 3 can have a force sensory layer only on the upper side or only on the lower side with regard to which we refer to the embodiments presented below.

The embodiment shown in FIG. 1 has a particular advantage since the measuring element 3 is accommodated in a sleeve 10 to secure it against twisting. The sleeve 10 (as well as the screw shaft 6 and the force-application elements 2a and 2b) can consist of an electrically conducting metal. By interposing the sleeve 10 relative movement between the screw head 2a and the coated elevations 5b and 5a is prevented on the one hand and a safeguard against twisting is obtained. For this purpose an additional twisting safeguard can also be provided by means of corresponding form-fitting catches.

It is, however, expressly emphasized that the sleeve 10 is not an essential feature of the overall invention. That is, all of the embodiments shown here are also suitable without a sleeve 10, i.e., they are in direct contact with the component 12a or the screw head 2a.

With regard to the structure of the measuring element 3, apart from the nature of the prominences 5a and 5b different structural forms with regard to the material of a core 3' of the measuring element 3 and the force sensory or electrically insulating layers applied thereon are also possible. In the present case the core is composed of simple unhardened steel. Depending on the application any hardened stainless steels or steel alloys are also possible or even ceramic materials or glass-fiber reinforced plastics (see the introduction to the description above).

Figure 2A:
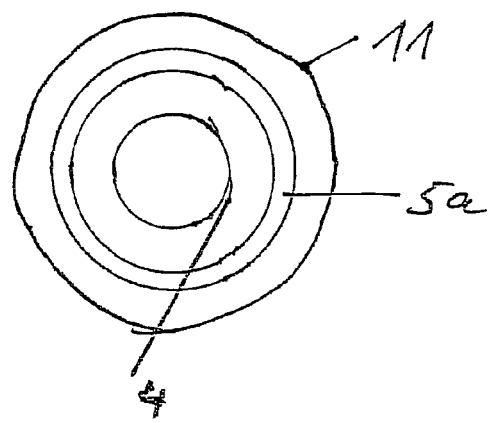
FIGS. 2a and 2b show a plan view and a cross-section of a first embodiment of a measuring element according to the invention.
Figure 2B:
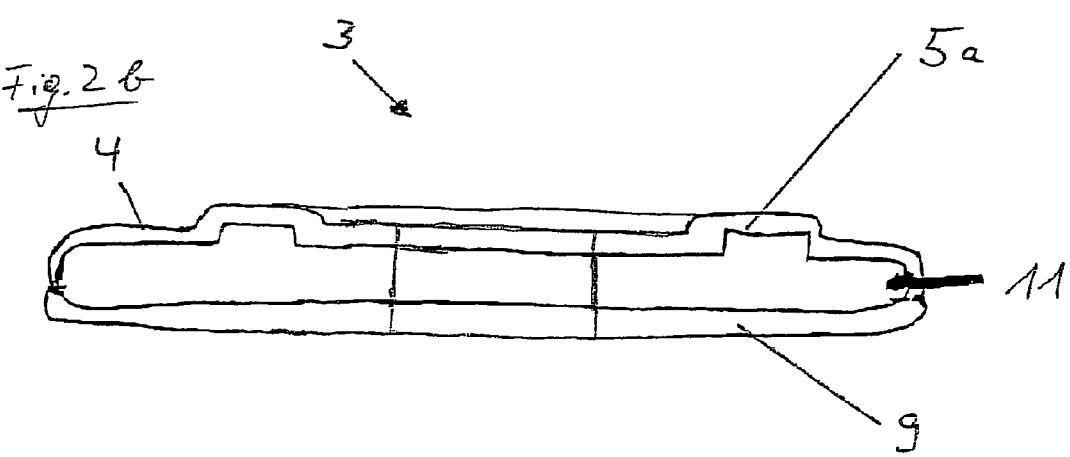

FIGS. 2a and 2b show another embodiment of a measuring element 3 according to the invention. This has an electrically insulating layer 9 on its flat lower side. In this case an electrical insulator has to be regarded as any substance having a specific resistance of $10^{15}$ ohm-cm or more. Examples of insulators coming into consideration are $Al_2O_3$, $TiO_2$, $SiO_2$, SiN or a material composed of high-ohmic, diamond-like carbon sold under the trade name "SICON®". The measuring element 3 has a flat, hollow cylindrical cross-section having only one elevation 5a on the upper side arranged concentrically about a central opening. In this case the upper side is coated with a force sensory layer 4. Depending on the shape of the desired curve of compressive force versus change in electrical resistance and depending on the hardness/brittleness of the force sensory layer 4, the cross-section of the prominences 5a perpendicular to the circumferential direction of these circular prominences can have differing shapes. If introduction of pressure over a large area is preferred rectangular cross-sectional shapes as shown in FIG. 2b are possible, but triangular or rounded shapes may be selected for a more pronounced increase in pressure.

FIGS. 3a to 3f show other embodiments of a measuring element 3 according to the invention. A common feature of all of them is that in the region of the elevations on the measuring element 3 they have at least in some areas a force sensory layer connected to an electrical contact. Advantageously, the force sensory layer should have a specific electrical resistance of less than $10^8$ to $10^{-2}$ ohm-cm.

FIG. 3a shows once again a hollow cylindrical version of the measuring element 3 with three concentric annular prominences 5a, 5b, 5c having a rectangular cross-section. The lower side of the measuring element 3 is covered with an insulator 9. FIG. 3b shows another embodiment having only two concentric elevations on the upper side but the circular disc is encased over its entire surface area by a continuous force sensory layer 4.

FIG. 3c shows another embodiment having only one circular elevation 5a on the upper side while the lower side of the measuring element 3 is uncoated (having neither a force sensory layer nor an insulating layer).

FIG. 3d shows another embodiment in which the upper side and lower side are each provided with identically shaped concentric annular prominences.

FIGS. 3e and 3f show other embodiments in which the lower side consists either of an insulator or a force sensory layer and the plurality of elevations on the upper side optionally have a cross-section perpendicular to the circumferential direction of the annular elevations which is triangular or rounded.

Finally, FIG. 4 shows another embodiment of a measuring element 3 according to the invention in plan view. This does not have a rotationally symmetrical design with respect to the central axis for passing through the screw shaft. Instead, a plurality of areas with elevations 5a' to 5e' are shown. These each consist of fields having support profiles which each differ in the type and/or number of elevations. The shapes coming into consideration are any knob-like or strip-like elements when viewed in plan view, eg those having a round, rectangular, circular arc-shaped plan view. The supporting elements can have different cross-sectional profiles. Thus, profiles having vertical and sloping edges as well as rounded cross-sectional profiles are feasible.

It is also possible to insulate different elevation areas electrically from one another (regardless of whether these are fitted on the upper and/or lower side of the measuring element 3). In doing so the different elevation areas may have identical or different support profiles. An application for this consists, for example, in compensating for inaccuracies in measurement due to temperature fluctuations.

The invention claimed is:

1. A control device for non-positive connections, in particular screw connections, wherein the device possesses force-application elements and at least one measuring element, wherein the measuring element is provided at least in some areas with a layer exhibiting a force sensory effect, characterized in that the force sensory layer changes its electrical resistance due to changes of an applied force and the surface of the layer has as support profiles flat prominences constructed for recording a force applied by the force application elements characterized in that the force sensory layer comprises diamond-like carbon-based layers including at least one of an amorphous and nanocrystalline structure.

2. The control device according to claim 1, characterized in that the force-application elements comprise the head of a set screw and the nut complementary thereto on the set screw.

3. The control device according to claim 1, characterized in that the measuring element possesses upper and lower sides located opposite one another, wherein at least one of the upper and lower side are each provided at least in part with a respective force sensory layer.

4. The control device according to claim 1, characterized in that in the areas not covered by the force sensory layer, the measuring element is provided with an electrically insulating layer or is uncoated in these areas.

5. The control device according to claim 1, characterized in that the measuring element has the shape of a disk with a central hole.

6. The control device according to claim 1, characterized in that the prominences are arranged in annular manner on the surface of the measuring element.

7. The control device according to claim 6, characterized in that a plurality of annular prominences is provided which are arranged concentrically relative to one another.

8. The control device according to claim 6, characterized in that the prominences have a rectangular, triangular or rounded shape perpendicular to the circumferential direction of the annular prominence.

9. The control device according to claim 1, characterized in that a plurality of prominence areas is provided, wherein each of these have a different type and/or number of prominences.

10. The control device according to claim 9, characterized in that the prominence areas are separated electrically from one another.

11. The control device according to claim 1, characterized in that the measuring element is accommodated in a sleeve to prevent changes in the position of the measuring element in the event of a movement of the force-application elements relative to one another.

12. The control device according to claim 1, characterized in that the measuring element has a core onto which the force sensory layer is applied.

13. The control device according to claim 1, characterized in that the core is composed of hardened or unhardened steel, alloyed steels or stainless steel, of ceramic materials or glass-fiber reinforced plastics.

14. The control device according to claim 1, characterized in that the force sensory layer is composed of amorphous carbon.

15. The control device according to claim 1, characterized in that this contains electric connections and an electric circuit for obtaining, transmitting and evaluating signals.

16. The control device according to claim 15, characterized in that signal transmission ensues by telemetry.

* * * * *

UNITED STATES PATENT AND TRADEMARK OFFICE
CERTIFICATE OF CORRECTION

| | | |
|---|---|---|
| PATENT NO. | : 7,350,419 B2 | Page 1 of 1 |
| APPLICATION NO. | : 10/511252 | |
| DATED | : April 1, 2008 | |
| INVENTOR(S) | : Holger Lüthje et al. | |

It is certified that error appears in the above-identified patent and that said Letters Patent is hereby corrected as shown below:

Column 7, Line 34; In claim 1, between "elements" and "characterized" insert -- , --.

Signed and Sealed this

Eighth Day of July, 2008

JON W. DUDAS
*Director of the United States Patent and Trademark Office*